(12) United States Patent
Savage

(10) Patent No.: US 9,904,435 B2
(45) Date of Patent: Feb. 27, 2018

(54) SYSTEM AND METHOD FOR ACTIONABLE EVENT GENERATION FOR TASK DELEGATION AND MANAGEMENT VIA A DISCUSSION FORUM IN A WEB-BASED COLLABORATION ENVIRONMENT

(75) Inventor: John Brandon Savage, San Carlos, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 13/345,502

(22) Filed: Jan. 6, 2012

(65) Prior Publication Data
US 2013/0179799 A1 Jul. 11, 2013

(51) Int. Cl.
G06F 3/00 (2006.01)
G06F 3/0482 (2013.01)
G06Q 10/10 (2012.01)

(52) U.S. Cl.
CPC ......... G06F 3/0482 (2013.01); G06Q 10/103 (2013.01)

(58) Field of Classification Search
CPC .... G06Q 10/00; G06Q 10/101; G06Q 10/103; G06Q 10/10; G06Q 10/06; G06F 3/0481; G06F 3/0482
USPC .................................................. 715/751, 753
See application file for complete search history.

(56) References Cited

U.S. PATENT DOCUMENTS

| | | | |
|---|---|---|---|
| 858,619 A | 7/1907 | Mj O'Farrell | |
| 5,748,735 A | 5/1998 | Ganesan | |
| 5,787,175 A | 7/1998 | Carter | |
| 5,799,320 A | 8/1998 | Klug | |
| 5,848,415 A | 12/1998 | Guck | |
| 5,864,870 A | 1/1999 | Guck | |
| 5,978,480 A | 11/1999 | Fong et al. | |
| 5,999,908 A | 12/1999 | Abelow | |
| 6,016,467 A | 1/2000 | Newsted et al. | |
| 6,055,543 A | 4/2000 | Christensen et al. | |
| 6,057,841 A | 5/2000 | Thurlow et al. | |
| 6,073,161 A | 6/2000 | DeBoskey et al. | |
| 6,098,078 A | 8/2000 | Gehani et al. | |
| 6,226,618 B1 | 5/2001 | Downs et al. | |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

Ben Parr, "Google Docs Improves Commenting, Adds E-mail Notifications," Mar. 16, 2011, mashable.com, pp. 1-6.*

(Continued)

Primary Examiner — Kieu Vu
Assistant Examiner — Asteway T Gattew
(74) Attorney, Agent, or Firm — Perkins Coie LLP

(57) ABSTRACT

System and method for actionable event generation for task delegation and management via a discussion forum in a web-based collaboration environment are disclosed. In one aspect, embodiments of the present disclosure include a method, which may be implemented on a system, for creating an actionable event via a discussion forum in a web-based collaboration environment. The method includes, for creating an actionable event via a discussion forum in a web-based collaboration environment, where, through commenting, the user is able to create the actionable event relating to the work item.

19 Claims, 16 Drawing Sheets

(56) References Cited

U.S. PATENT DOCUMENTS

| | | |
|---|---|---|
| 6,226,630 B1 | 5/2001 | Billmers |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,687,878 B1 | 2/2004 | Eintracht et al. |
| 6,714,968 B1 | 3/2004 | Prust |
| 6,735,623 B1 | 5/2004 | Prust |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,275,244 B1 | 9/2007 | Charles Bell et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,665,093 B2 | 2/2010 | Maybee et al. |
| 7,676,542 B2 | 3/2010 | Moser et al. |
| 7,698,363 B2 | 4/2010 | Dan et al. |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 8,027,976 B1 | 9/2011 | Ding et al. |
| 8,090,361 B2 | 1/2012 | Hagan |
| 8,103,662 B2 | 1/2012 | Eagan et al. |
| 8,117,261 B2 * | 2/2012 | Briere et al. ................ 709/204 |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,239,918 B1 | 8/2012 | Cohen |
| 8,326,814 B2 | 12/2012 | Ghods et al. |
| 8,347,276 B2 | 1/2013 | Schadow |
| 8,370,803 B1 | 2/2013 | Holler et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,745,267 B2 | 6/2014 | Luecke et al. |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,930,475 B1 | 1/2015 | North et al. |
| 8,949,939 B2 | 2/2015 | Peddada |
| 8,966,062 B1 | 2/2015 | Giese et al. |
| 8,990,955 B2 | 3/2015 | Hymel et al. |
| 9,535,909 B2 | 1/2017 | Masse et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 * | 10/2003 | Kasriel .................. 707/2 |
| 2003/0217171 A1 | 11/2003 | Von Stuermer et al. |
| 2003/0228015 A1 | 12/2003 | Futa et al. |
| 2004/0021686 A1 * | 2/2004 | Barberis .................. 345/738 |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0038997 A1 | 2/2005 | Kojima et al. |
| 2005/0044250 A1 | 2/2005 | Gay et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0053088 A1 | 3/2006 | Ali et al. |
| 2006/0070083 A1 | 3/2006 | Brunswig et al. |
| 2006/0075071 A1 | 4/2006 | Gillette |

(56) References Cited

U.S. PATENT DOCUMENTS

| | | |
|---|---|---|
| 2006/0101328 A1* | 5/2006 | Albornoz ............... G06Q 10/10 715/201 |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1* | 11/2006 | Horton ........................ 707/201 |
| 2006/0265489 A1 | 11/2006 | Moore |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0016680 A1 | 1/2007 | Burd et al. |
| 2007/0038934 A1 | 2/2007 | Fellman |
| 2007/0061266 A1 | 3/2007 | Moore et al. |
| 2007/0061393 A1 | 3/2007 | Moore |
| 2007/0061487 A1 | 3/2007 | Moore et al. |
| 2007/0067349 A1 | 3/2007 | Jhaveri et al. |
| 2007/0079242 A1 | 4/2007 | Jolley et al. |
| 2007/0106536 A1 | 5/2007 | Moore |
| 2007/0106537 A1 | 5/2007 | Moore |
| 2007/0106750 A1 | 5/2007 | Moore |
| 2007/0106751 A1 | 5/2007 | Moore |
| 2007/0106752 A1 | 5/2007 | Moore |
| 2007/0106753 A1 | 5/2007 | Moore |
| 2007/0106754 A1 | 5/2007 | Moore |
| 2007/0115845 A1 | 5/2007 | Hochwarth et al. |
| 2007/0116036 A1 | 5/2007 | Moore |
| 2007/0116037 A1 | 5/2007 | Moore |
| 2007/0124460 A1 | 5/2007 | McMullen et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0168461 A1 | 7/2007 | Moore |
| 2007/0214180 A1 | 9/2007 | Crawford |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0266304 A1 | 11/2007 | Fletcher et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0028323 A1* | 1/2008 | Rosen et al. .................. 715/752 |
| 2008/0040151 A1 | 2/2008 | Moore |
| 2008/0040173 A1 | 2/2008 | Aleong et al. |
| 2008/0040503 A1 | 2/2008 | Kleks et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahiad et al. |
| 2008/0250028 A1 | 10/2008 | Rutherglen et al. |
| 2008/0250333 A1 | 10/2008 | Reeves et al. |
| 2008/0250348 A1 | 10/2008 | Alimpich et al. |
| 2008/0271095 A1 | 10/2008 | Shafton |
| 2008/0294899 A1 | 11/2008 | Gazzetta et al. |
| 2009/0019093 A1 | 1/2009 | Brodersen et al. |
| 2009/0019426 A1 | 1/2009 | Baeumer et al. |
| 2009/0037520 A1 | 2/2009 | Loffredo |
| 2009/0043848 A1 | 2/2009 | Kordun |
| 2009/0044128 A1 | 2/2009 | Baumgarten et al. |
| 2009/0049131 A1* | 2/2009 | Lyle et al. .................... 709/206 |
| 2009/0119322 A1 | 5/2009 | Mills et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0164438 A1 | 6/2009 | Delacruz |
| 2009/0171983 A1 | 7/2009 | Samji et al. |
| 2009/0172773 A1 | 7/2009 | Moore |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0234850 A1 | 9/2009 | Kocsis et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0259694 A1* | 10/2009 | Hama ................. G06Q 10/1093 |
| 2009/0260060 A1 | 10/2009 | Smith et al. |
| 2009/0265430 A1 | 10/2009 | Bechtel et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | Fitzgerald et al. |
| 2009/0327961 A1 | 12/2009 | De Vorchik et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1* | 7/2010 | Noland et al. ...................... 705/3 |
| 2010/0185932 A1 | 7/2010 | Coffman et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0318893 A1* | 12/2010 | Matthews ............. G06F 17/241 715/230 |
| 2010/0322252 A1 | 12/2010 | Suganthi et al. |
| 2010/0325527 A1 | 12/2010 | Estrada et al. |

(56) References Cited

U.S. PATENT DOCUMENTS

| | | |
|---|---|---|
| 2010/0325559 A1 | 12/2010 | Westerinen et al. |
| 2010/0332401 A1 | 12/2010 | Prahlad et al. |
| 2010/0332962 A1 | 12/2010 | Hammer et al. |
| 2011/0016409 A1 | 1/2011 | Grosz et al. |
| 2011/0022559 A1 | 1/2011 | Andersen et al. |
| 2011/0022642 A1 | 1/2011 | Demilo et al. |
| 2011/0022812 A1 | 1/2011 | Van Der Linden et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145589 A1 | 6/2011 | Camenisch et al. |
| 2011/0145744 A1 | 6/2011 | Haynes et al. |
| 2011/0154180 A1* | 6/2011 | Evanitsky et al. ............ 715/233 |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Ci Don |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0057696 A1 | 3/2012 | Chew |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1* | 7/2012 | Antebi et al. ............ 715/229 |
| 2012/0203670 A1 | 8/2012 | Piersol |
| 2012/0203908 A1 | 8/2012 | Beaty et al. |
| 2012/0214444 A1 | 8/2012 | McBride et al. |
| 2012/0221789 A1 | 8/2012 | Felter |
| 2012/0222106 A1 | 8/2012 | Kuehl |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1* | 11/2012 | Cutler et al. ............ 715/751 |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0331441 A1 | 12/2012 | Adamson |
| 2013/0007471 A1 | 1/2013 | Grab et al. |
| 2013/0007587 A1 | 1/2013 | Marantz et al. |
| 2013/0007894 A1 | 1/2013 | Dang et al. |
| 2013/0013560 A1 | 1/2013 | Goldberg et al. |
| 2013/0014023 A1* | 1/2013 | Lee et al. ............ 715/751 |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0103677 A1 | 4/2013 | Chakra et al. |
| 2013/0104251 A1 | 4/2013 | Moore et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282776 A1 | 10/2013 | Durrant et al. |
| 2013/0282830 A1 | 10/2013 | Besen et al. |
| 2013/0291060 A1 | 10/2013 | Moore |
| 2013/0305039 A1 | 11/2013 | Gauda |
| 2013/0326344 A1 | 12/2013 | Masselle et al. |
| 2014/0007205 A1 | 1/2014 | Oikonomou |
| 2014/0013112 A1 | 1/2014 | Cidon et al. |

(56) References Cited

U.S. PATENT DOCUMENTS

| | | |
|---|---|---|
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0181968 A1 | 6/2014 | Ge et al. |
| 2014/0208414 A1 | 7/2014 | Brandwine et al. |
| 2014/0213371 A1 | 7/2014 | Jain |
| 2014/0281870 A1 | 9/2014 | Vogel et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |
| 2015/0056596 A1 | 2/2015 | Bercovitz et al. |
| 2015/0081624 A1 | 3/2015 | Masse et al. |
| 2015/0082197 A1 | 3/2015 | Pearl et al. |
| 2016/0004820 A1 | 1/2016 | Moore |
| 2016/0065627 A1 | 3/2016 | Pearl et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1933242 A1 | 6/2008 |
| EP | 2610776 A2 | 7/2013 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2006250944 | 10/2008 |
| KR | 20020017444 A | 3/2002 |
| KR | 20040028036 | 4/2004 |
| KR | 20050017674 | 2/2005 |
| KR | 20060070306 A | 6/2006 |
| KR | 20060114871 A | 11/2006 |
| KR | 20070043353 | 4/2007 |
| KR | 20070100477 | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2004097681 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2011109416 A2 | 9/2011 |
| WO | WO-2012167272 A1 | 12/2012 |
| WO | WO-2013009328 A2 | 1/2013 |
| WO | WO-2013041763 A1 | 3/2013 |
| WO | WO-2013166520 | 11/2013 |

OTHER PUBLICATIONS

"Microsoft Office SharePoint 2007 User Guide," Feb. 16, 2010, pp. 1-48.*
Lars, "35 Very Useful Online Tools for Improving your Project Management and Team Collaboration," Mar. 31, 2010, tripwiremagazine.com, pp. 1-32.*
"Agilewords—How to request approval," Jan. 13, 2011, https://www.youtube.com/watch?v=3-Ov3DYNN3Q, 2 pages.*
"Agilewords—Features," Jun. 1, 2011, http://web.archive.org/web/20110601223756/http://www.agilewords.com/product/features, 3 pages.*
International Search Report and Written Opinion for PCT/US2011/060875 dated Oct. 30, 2012, pp. 1-10.
International Search Report and Written Opinion for PCT/US2011/039126 dated Oct. 6, 2011, pp. 1-13.
International Search Report and Written Opinion for PCT/US2008/012973 dated Apr. 30, 2009, pp. 1-11.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
International Search Report and Written Opinion for PCT/US2011/056472 dated Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 dated Jul. 2, 2012, pp. 1-16.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
International Search Report and Written Opinion for PCT/US2010/070366, Applicant: Box, Inc., dated Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., dated May 7, 2013, 10 pages.
International Search Report and Written Opinion for PCT/US2013/034662, Applicant: Box, Inc., dated May 31, 2013, 10 pages.
Exam Report for GB1306011.6, Applicant: Box, Inc. dated Apr. 18, 2013, 8 pages.
Exam Report for GB1300188.8, Applicant: Box, Inc. dated May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. dated Jun. 4, 2013, 8 pages.
International Search Report and Written Opinion for PCT/US2013/029520, Applicant: Box, Inc., dated Jun. 26, 2013, 10 pages.
International Search Report and Written Opinion for PCT/US2013/023889, Applicant: Box, Inc., dated Jun. 24, 2013, 13 pages.
International Search Report and Written Opinion for PCT/US2013/035404, Applicant: Box, Inc., dated Jun. 26, 2013, 13 pages.
International Search Report and Written Opinion for PCT/US2013/039782, Applicant: Box, Inc., dated Aug. 28, 2013, 15 pages.
Exam Report for GB1313559.5, Applicant: Box, Inc., dated Aug. 22, 2013, 19 pages.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. dated Mar. 10, 2014, 4 pages.
Exam Report for GB1312264.3, Applicant: Box, Inc. dated Mar. 24, 2014, 7 pages.

(56) References Cited

OTHER PUBLICATIONS

Exam Report for GB1314771.5, Applicant: Box, Inc. dated Feb. 17, 2014, 7 pages.
John et al., "Always Sync Support Forums—View topic—Allway sync funny behavior," Allway Sync Support Forum at http://sync-center.com, Mar. 28, 2011, XP055109680, 2 pages.
Search Report for EP 11729851.3, Applicant: Box, Inc. dated Feb. 7, 2014, 9 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
"PaperPort Professional 14," PC Mag. Corn review, published Feb. 2012. Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Srnartphone and Table Devices," QuickOffice Press Release, Nov. 21, 2011, QuickOffice Inc., 2 pages.
Exam Report for GB1309209.3, Applicant: Box, Inc. dated Oct. 30, 2013, 11 pages.
Exam Report for GB1310666,1, Applicant: Box, Inc. dated Aug. 30, 2013, 10 pages.
Exam Report for GB1316532,9, Applicant: Box, Inc. dated Oct. 31, 2013, 10 pages.
Exam Report for 081316533.7, Applicant: Box, inc. dated Oct. 8, 2013, 9 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
"Understanding Metadata," National Information Standards Organization, NISO Press, 2004, 20 pages.
International Search Report and Written Opinion for PCT/US2012/056955, Applicant: Box, Inc., dated Mar. 27, 2013, pp. 1-11.
International Search Report and Written Opinion for PCT/US2011/047530, Applicant: Box, Inc., dated Mar. 22, 2013, pp. 1-10.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/063041, Applicant: Box, Inc., dated Mar. 29, 2013, 12 pages.
International Search Report and Written Opinion for PCT/US2011/057938, Applicant: Box, Inc., dated Mar. 29, 2013, 10 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the Internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet,http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. dated May 26, 2014, 6 pages.
Exam Report for GB1318792.7, Applicant: Box, Inc. dated May 22, 2014, 2 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1410569.6 Applicant: Box, Inc. dated Jul. 11, 2014, 9 pages.
Sommerer, "Presentable Document Format: Improved On-demand PDF to HTML Conversion," retrieved from the internet, http://research.microsoft.com, Nov. 2004, 8 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for Smart Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. dated Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. dated Feb. 17, 2015, 6 pages.
Exam Report for GB1312264.3 Applicant: Box, Inc. dated Jan. 30, 2015, 5 pages.
Exam Report for GB1312874.9 Applicant: Box, Inc. dated Feb. 10, 2015, 7 pages.

(56) References Cited

OTHER PUBLICATIONS

Exam Report for GB1316685.5 Applicant: Box, Inc. dated Feb. 17, 2015, 5 pages.
Exam Report for Ep 13185269.1, Applicant: Box, Inc. dated Feb. 13, 2015, 8 pages.
Exam Report for GB1316532.9 Applicant: Box, Inc. dated Mar. 27, 2015, 6 pages.
Burney, "How to Move Document from Your Computer to Your iPad and Back Again," May 31, 2011, 3 pages.
"Dropbox: Sync only specific folders," posted on Feb. 9, 2012, available online at http://www.tech-recipes.com/rx/20865/dropbox-sync-only-specific-folders/, 4 pages.
Exam Report for GB1311459.0, Applicant: Box, Inc., dated Aug. 19, 2013, 6 pages.
U.S. Appl. No. 14/026,674, filed Sep. 13, 2013, Configurable Event-Based Automation Architecture for Cloud-Based Collaboration Platforms.
U.S. Appl. No. 61/877,917, filed Sep. 13, 2013, Systems and Methods for Configuring Event-Based Automation in Cloud-Based Collaboration Platforms.
U.S. Appl. No. 14/075,849, filed Nov. 8, 2013, Systems and Methods for Configuring Event-Based Automation in Cloud-Based Collaboration Platforms.
U.S. Appl. No. 14/474,008, filed Aug. 28, 2014, Configurable Metadata-Based Automation and Content Classification Architecture for Cloud-Based Collaboration Platforms.

* cited by examiner

SYSTEM AND METHOD FOR ACTIONABLE EVENT GENERATION FOR TASK DELEGATION AND MANAGEMENT VIA A DISCUSSION FORUM IN A WEB-BASED COLLABORATION ENVIRONMENT

BACKGROUND

With the increase of electronic and digital content being used in enterprise settings or other organizations as the preferred mechanism for project, task, and work flow management, as has the need for streamlined collaboration and sharing of digital content and documents. In such an environment, multiple users are sharing, accessing and otherwise performing actions or tasks on content and files in a shared work space, where any number of users may have access to a given file or may want to or need to perform an action on the file at any given time.

Therefore, functionalities for downloading, editing, revising, viewing of files and documents have become regularly accessed features of such an online collaboration environment and as such are integral components of a user's perception of system capabilities. Due to the highly collaborative nature of a web-based file sharing and document management environment, the ease with which a user interface can be used by multiple users to collaboratively engage in real-time discussion sessions regarding files or documents while also providing intuitive mechanisms in the GUI for users to conveniently take action on a document is also a critical metric in a user's perception of the user friendliness and ease of use of the system.

DETAILED DESCRIPTION

Figure 1:
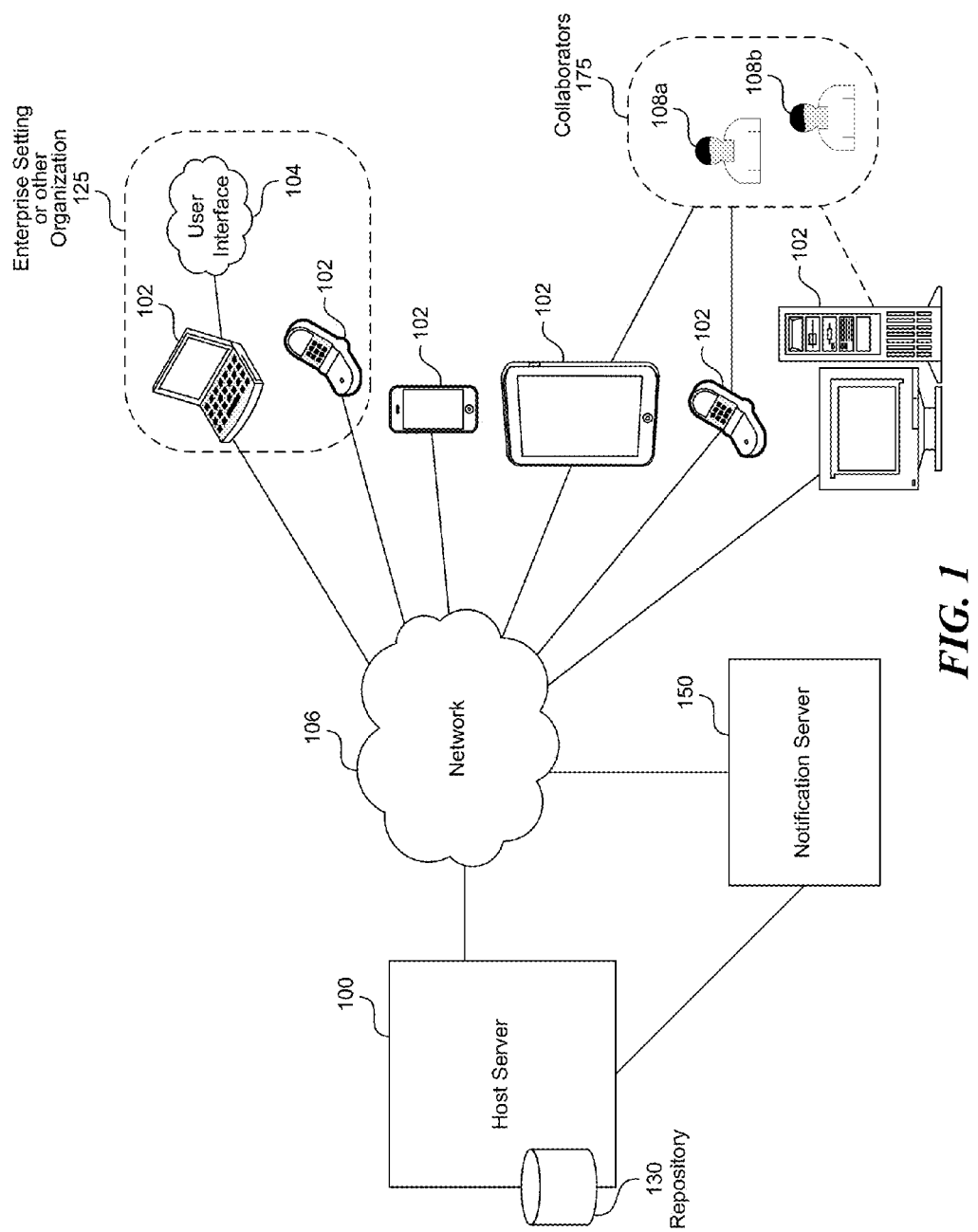
FIG. 1 illustrates an example diagram of a system having a host server able to generate actionable events for task delegation and/or task management related to work items via a user interface having a discussion forum.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for actionable events generation for task delegation and/or task management related to, for instance, work items via a user interface having a discussion forum.

FIG. 1 illustrates an example diagram of a system having a host server 100 able to generate actionable events for task delegation and/or task management related to work items via a user interface having a discussion forum to various collaborators 175 through client devices 102.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
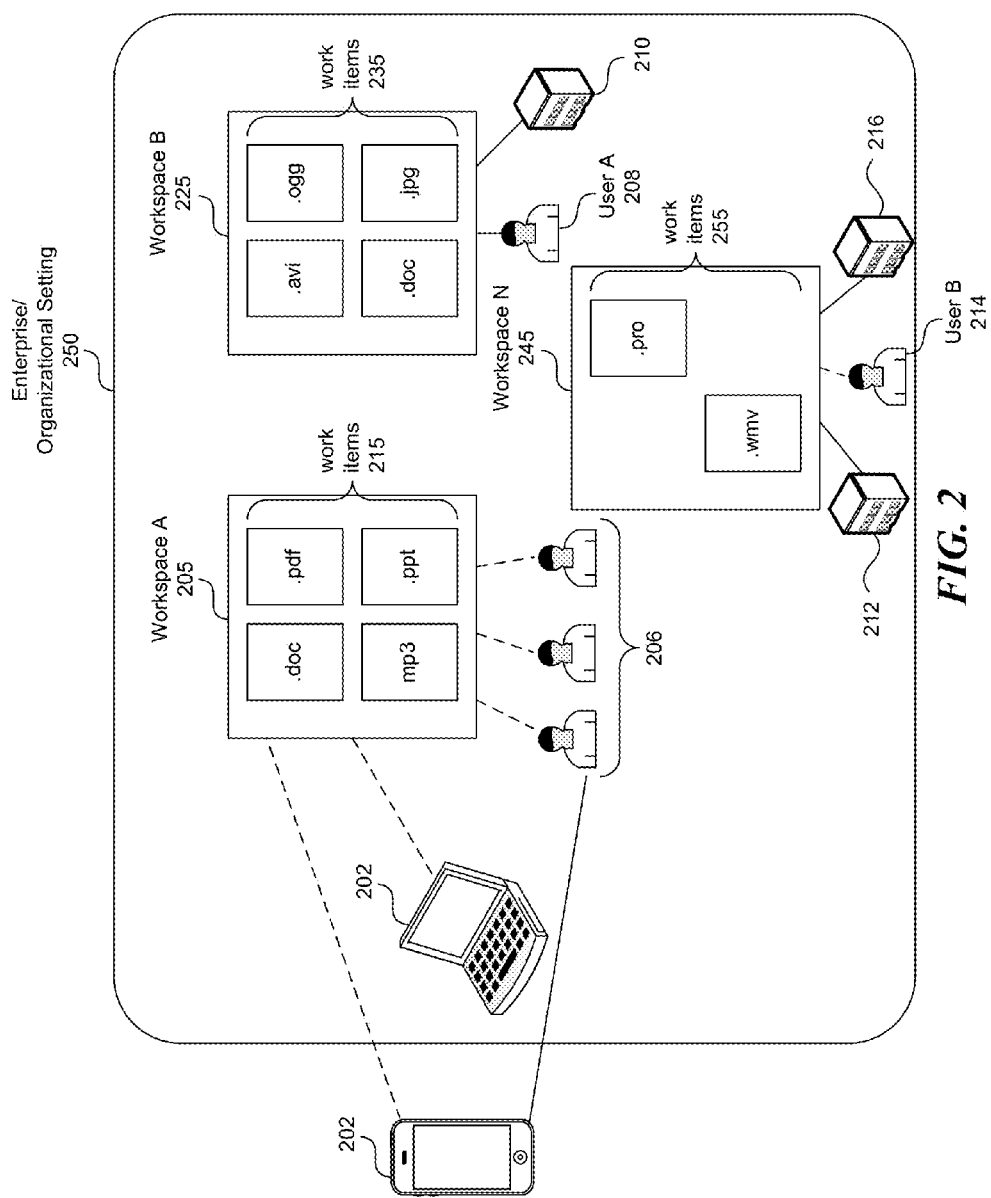
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of the online or web-based collaboration environment includes user interface features which allow users to generate actionable events for task delegation and/or task management related to work items via a user interface having a discussion forum (e.g., by user devices 102). Specifically, the host server 100 enables creation and the delegation of action items relating to a work item to collaborator 175 via user devices 102 in an online collaboration environment via a unified user interface.

For example, a user can, in association with commenting on a work item or the status of a work item, also associate and/or generate action items (e.g., tasks including, for example, review, approve, update, edit, complete, work on, etc.) relating to one or more work items in the comment or otherwise using the same user interface for the commenting. Example screenshots showing the associated features are illustrated with further reference to FIG. 8-15.

Functions and techniques disclosed for platform and/or application independent file access/editing are further described with reference to the components illustrated in the example of FIG. 5. Functions and techniques performed by the host server 100 and/or other related components therein are described, respectively, in detail with further reference to the examples of FIG. 6-7.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
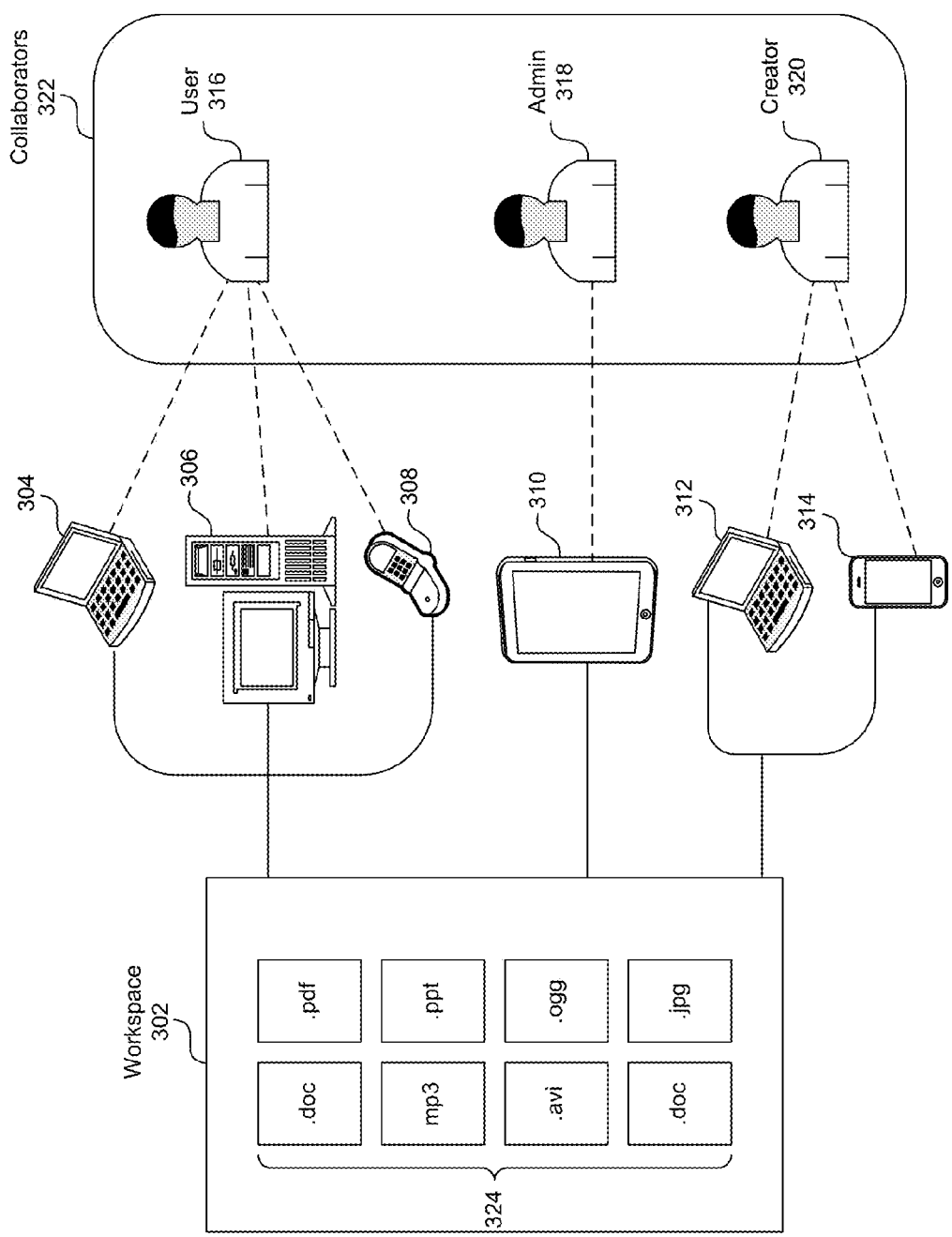
FIG. 3 depicts an example diagram of a workspace in an online or web-based collaboration environment accessible by multiple collaborators through various devices.

FIG. 3 depicts an example diagram of a workspace 302 in an online or web-based collaboration environment accessible by multiple collaborators 322 through various devices.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302 in accordance with the platform and/or application independent mechanisms disclosed herein, as further described with references to the examples of FIG. 4-13. Users can also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same work space), either in the same work space 302 or in some other work space. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant work spaces, in the same user interface, as shown in the example screenshots of FIG. 8-14.

Figure 4:
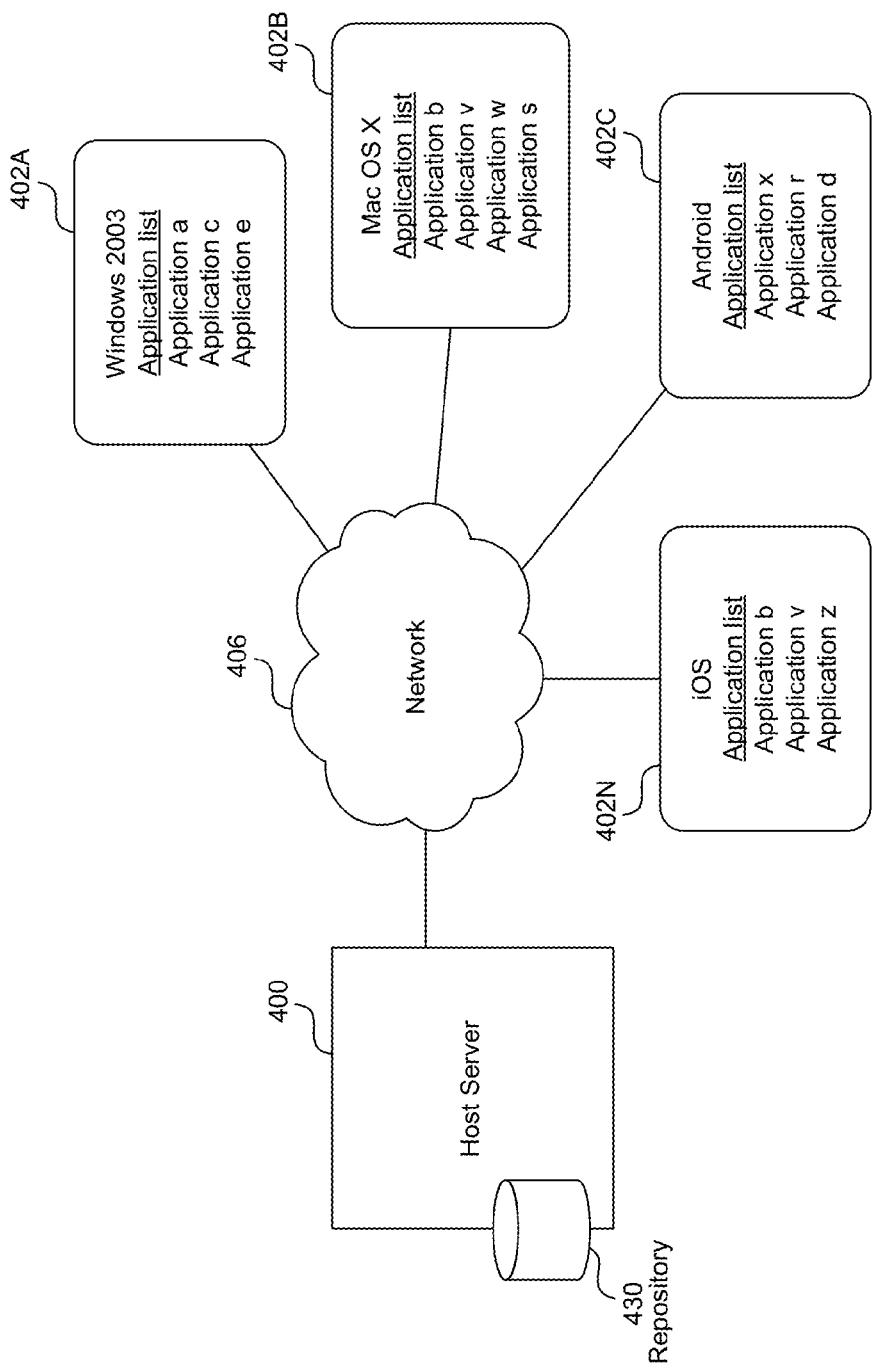
FIG. 4 depicts a block diagram illustrating an example system in which work items or files hosted by the host server of a collaboration environment can be edited or accessed remotely by devices independent of the platform or locally available applications.

FIG. 4 depicts a block diagram illustrating an example system in which work items or files hosted by the host server 400 of a collaboration environment can be edited or accessed remotely by devices 402 (402A-N) independent of the platform or locally available applications.

For example, any given file initially stored on the host server 400 (e.g., in the repository 430) can be edited using any of the devices 402A-N, despite the differing platforms and operating systems. Furthermore, any given file stored on the host 400 can be edited or accessed using any device 402A-N, as long as each individual device has an application which can open/edit the file type of the requested file.

In general, the process of identifying a local application suitable for accessing a file requested from the host server 400 is streamlined and automatic, and can be performed without prompting the user. Since the local components on a local device is able to query or monitor the operating system of any of the devices 402A-N to identify one or more suitable applications (e.g., default application or preferred application) for the file type of the requested file. By communicating with the operating system, (e.g., by monitoring the OS through the API, registry, or other methods), the process for detecting a suitable application for each device is operating system (platform)-independent and application-independent, thus working with any of the devices 402A-N and any other types of devices running different operating systems, platforms, and/or having installed thereon different applications.

Figure 5:
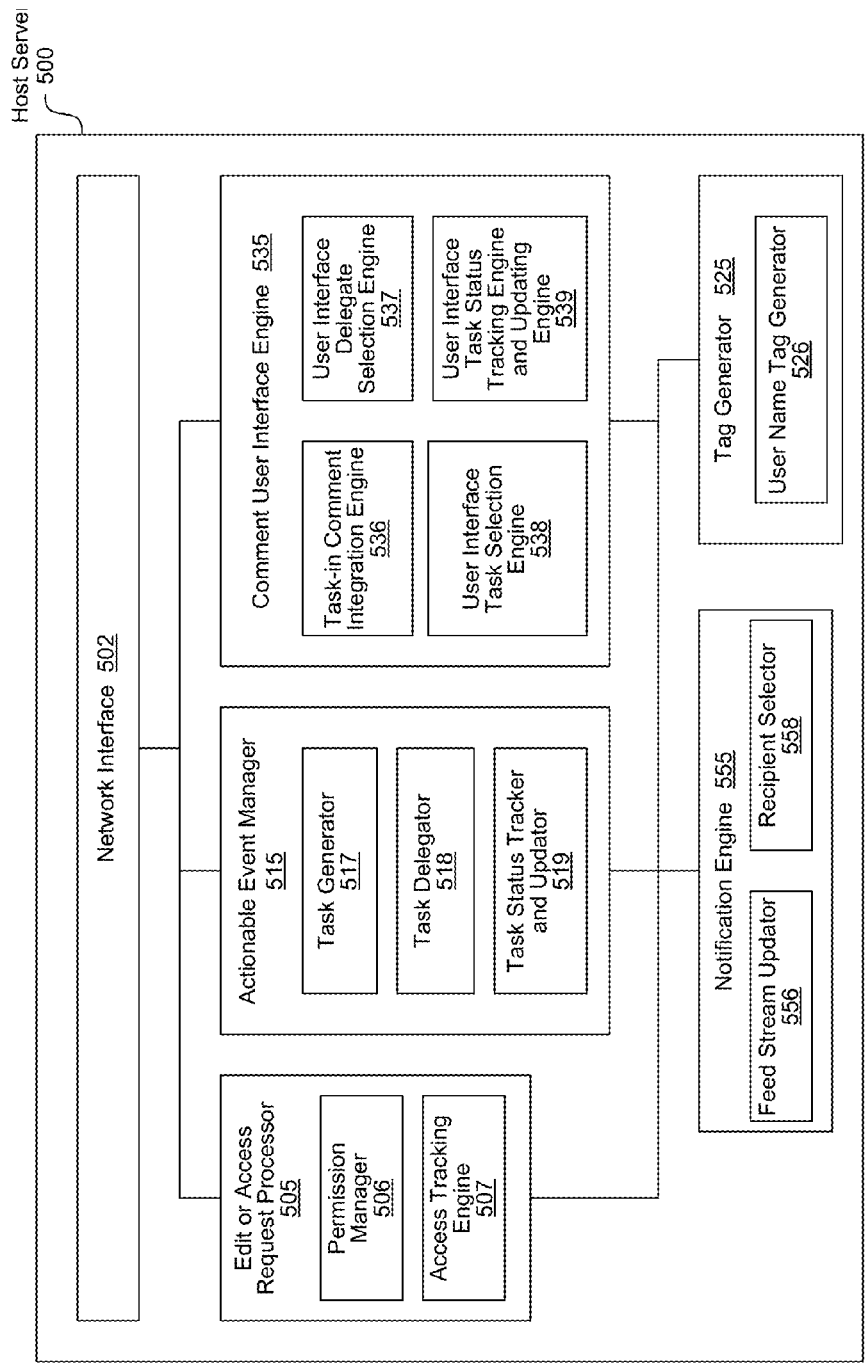
FIG. 5 depicts a block diagram illustrating an example of components in a host server for able to generate actionable events for task delegation and/or task management related to work items via a user interface having a discussion forum in an online collaboration environment over a network.

FIG. 5 depicts a block diagram illustrating an example of components in a host server 500 able to generate actionable events for task delegation and/or task management related to work items via a user interface having a discussion forum in an online collaboration environment over a network.

The host server 500 of the web-based or online collaboration environment can generally be a cloud-based service. The host server 500 can include, for example, a network interface 502, an edit or access request processor 505 having a permission manager 506 and/or an access tracking engine 507, an actionable event manager 515 having a task generator 157, a task delegator 518, and/or a task status tracker/updator 519, for example. The host server 500 can also include a comment user interface engine 535 having a task-in comment integration engine 536, a user interface delegatee selection engine 537, a user interface task selection engine 538, and/or a user interface task status tracking/updating engine 539, and/or a tag generator 525 having, for example, a user name tag generator 526. One embodiment, of the host server 500 further includes a notification engine 555 having, for example, a feed stream updator 556 and/or a recipient selector 558. Additional or less components/modules/engines can be included in the host server 500 and each illustrated component.

The network interface 502 can be a networking module that enables the host server 500 to mediate data in a network with an entity that is external to the host server 400, through any known and/or convenient communications protocol supported by the host and the external entity. The network interface 502 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," a "processor," a "tracker," a "detector," a "generator," a "launcher," a "selector," an "updator," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 500 includes the edit or access request processor 505 which can receive, detect, process, identify, parse, translate, and/or determine a request from a user or user device to view, edit, modify, read, comment on, share, assign, generate actionable event, delegate task, or otherwise access a work item (e.g., file) stored on, managed by, or otherwise hosted by the host system 500. The request can be submitted from a user (e.g., through a user interface) to edit, view, comment, share, view, generate actionable event, assign task, or perform any other action on one or more files or work items stored on the host 500 (e.g., a host of a web-based or online collaboration platform).

The user can identify the files, content, or items to be accessed via the host server 500 one-by-one and queue up multiple items (e.g., including but not limited to files, folders, documents, images, audio, videos, or other media/multimedia content, etc.) to be accessed, viewed, or edited in a request. The user can also select one or more of the items to be accessed, and detected or managed by the edit/access request process 505. Using a drop down box or other user interface features in the web interface of the host server 500, e.g., via a button such as an 'edit' or 'download', or 'request' button in the user interface. In some instances, the 'edit' button may be disabled for selection when the file is locked (e.g., in use by another user) and unavailable for edit or for download to edit as a mechanism for version control. Alternatively, the user may be allowed to edit the file anyways but with a prompt warning that the file is in use and allowing the user to make the decision. In this case, the file may be edited but stored as a different version by the host server 500.

Responsive to detection of the request (e.g., by the edit/access request processor 505), user permission can initially be verified, for example, using the credentials submitted by the user (e.g., by the permission manager 506). The version control mechanisms can be performed for example, by the access tracking engine 507 to implement a process whereby only one user can edit one file at a given time, or implementation of multiple user edits, but using a method to track all edits with procedures in place for conflict resolution (e.g., by maintaining multiple copies either on the host server 500 and/or on respective user devices used by the multiple users).

In one embodiment, the request processor 505, in response to determining that the item at the host server 500 which requested for local access by a user on a user device, is not locked or in use by another user, is enabled for editing on the user device and can be downloaded remotely.

The permission manager 506 can, for example, provide a file to a first user for access at a first device of the first user's, using a first application which is available to the first user at the first device and providing the file to a second user for access at a second device of the second user's, using a second application which is available to the second user at the second device.

The permission manager 506 and/or the access tracking engine 507 allows both users and any additional users to edit/access, comment on the same file while managing potential conflicts, for example, by timing the edits and access so that changes from different users can be factored in, and/or keeping multiple versions of the same file and resolving conflicts if applicable. For example, the file can be provided to the first and second users and enabled for editing, commenting, or other types of access, at either the first device or the second device when the file is not locked or in use by the other party. In some instances, prior to providing the file to the first and second users, an authentication process is performed to verify or confirm access rights, for example, by the permission manager 506.

Embodiments of the present disclosure relate to creation or generation of actionable events for task delegation and/or management via a discussion forum or a discussion/commenting user interface in the online collaboration platform. In the context of task creation, assignment, delegation, and management, the edit or access request processor 505 receives, processes, detects, analyzes, or identifies the requests to create an actionable event for a work item (file), including one or more tasks to be performed on the work item by various assigned users.

The permission manager 506 can determine whether the user who created the actionable event or task has the proper permissions to do so. The permission manager 506 can further determine whether the users assigned with the various tasks have the appropriate permissions to perform the assigned tasks on the given work item/file. In one embodiment, the access tracking engine 507 is able to resolve any potential conflicts among tasks to be performed on a given work item/file assigned to/delegated to different users. For example, the access tracking engine 507 may track the ordering in which tasks are performed such that task statuses can be appropriately updated and reflected to each user working on the same file. The access tracking engine 507 may also detect any potentially conflicting tasks from being performed or warn the relevant users including the task assignor and/or the delegates.

The access tracking engine 507 can in some instances, prohibit conflicting tasks from being assigned. For example, the access tracking engine 507 may not allow two simultaneous assignments to edit a given file. Alternatively, the access tracking engine 507 may automatically provide the file to each of the users assigned to edit a file sequentially such that simultaneous and potentially conflicting changes are not being made to the file.

Actionable events can be created by the actionable events manager 515 and can include by way of example but not limitation, an assigned task such as, a task for another user to review the work item, a task for another user to update or approve the work item, a task for another user to edit or comment on the work item, etc. For example, through a request received from the edit/access request processor 505, the actionable event manager 515 can identify, detect, parse, retrieve, and/or analyze any request to create or generate an actionable event.

The task generator 517 can generate/create the task on receiving the request and assign it to a relevant user if applicable (e.g., via the task delegator 518). In one embodiment, the task is assigned to the relevant user upon verification by the permission manager 506 that the assigned user has the appropriate rights and permissions. In delegating the tasks, the task delegator 518 presents the task to the delegate such that it is accessible via their login, for example, through a commenting or status update/feed user interface. For example, the assigned task can be depicted through a page for the work space with which the given file is associated used for commenting. The assigned task can also be depicted through a page where status updates or feeds regarding files or work spaces are showing.

In one embodiment, the task status tracker and updator 519 detects, tracks, monitors, updates, the status of any actionable event which has been created or assigned to users/collaborators. The status tracker/updator 519, upon detecting a status change (e.g., item updated, item approved, rejected, in progress, etc.) or upon completion of a task, can update the user interface such that a current status is indicated and reflected, for example, generally also in an integrated fashion with a user interface where comments or status updates are depicted/submitted and/or from where the tasks were created. A delegate can also directly update a task status through a unified user interface where task assignment features are integrated with commenting/status update functionalities, as further illustrated in the example screenshots of FIG. 15.

In accordance with embodiments of the present disclosure, requests for actionable event generation or creation can be received via a user interface to the collaboration platform for commenting (e.g., a discussion forum) on files, folders, or work spaces. The comment user interface engine 535 is able to detect such requests via a commenting interface or a status/feed update user interface, for example. In general, a commenting interface includes a user interface or GUI where a users and/or collaborators can comment on work items, or comment on each others' comments (e.g., a discussion forum), or comment within or on work spaces. A status/feed update user interface can be the same interface as the commenting interface of a separate user interface and can include any UI or GUI with real time, near real time, or non-real time updates to files, work spaces, or user activity in a work space among multiple collaborators.

In one embodiment, actionable events for task generation are created or specified by a user via a commenting or status update user interface. The task-in comment integration engine 536 can integrate these features enabling task creation through commenting, as shown in the example screenshot of FIG. 8, for example.

In addition, a delegate of the task or actionable event can also be specified via the same interface. The user interface delegate selection engine 537 can generate or integrate the features allowing a user to select another user or collaborator to delegate a specific task to via a commenting or status update/feed update user interface, as shown in the example screenshot of FIG. 9. In addition, the specific task that is selected in creating the actionable event can also be performed in the integrated user interface. The user interface task selection engine 538 integrates the task identification and selection features into the commenting and/or status update/feed update user interface, as shown in the example screenshot of FIG. 8.

Furthermore, the task status can be updated and also indicated in the comment and/or status update/feed update user interface for example by the status tracking and updating engine 539, as shown in the example screenshots of FIG. 9-13. For example, an assigning or delegating user can, through the same user interface where a task was created and delegated via commenting, can monitor the status of delegated/assigned tasks.

One embodiment of the host server 500 further includes a tag generator 525. The tag generator 525 allows users to add tags (e.g., hash tags or other tags) linking terms or phrases submitted in a comment via a user interface to the collaboration platform, to hyperlinks or other metadata. The linked content or other metadata may be content that is on the collaboration platform and/or include external content (e.g., third party content or third party sites). In one embodiment, user names can be tagged (e.g., via the user name tag generator 526) in a comment submitted regarding a work item or in a discussion forum and used for linking additional information about the user. User names can also be tagged in a comment or dialogue in the user interface, for example, for use in assigning tasks to the user or collaborator.

The notification engine 555 can generally can users, which can be collaborators of the user who performed the activity in the work space via one or more of many mechanisms, including but not limited to, email, SMS, voice-message, text-based message, RSS, feed, etc., as described in detail with further reference to related co-pending U.S. patent application Ser. No. 13/152,982 filed on Jun. 3, 2011. The contents of which are incorporated herein by reference in its entirety.

In one embodiment, the notification is depicted through a web-browser used by the other user to access the web-based collaboration environment, for access in real time or near real time to when the activity was performed by the user. When notifying a user in real time through a web-browser, the notification engine 415 can utilize a push-enabled service to ensure real time notification. In one embodiment, the notification is sent by a component or another server which implements push technology (e.g., the notification server 500 shown in the example of FIG. 5). The push-enabled service can be implemented via long poll or HTTP streaming, for example, by the notification severs 500 or another component, device which may be internal to or external to the host server 500. In addition, the host server 500 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.)

The notification engine 555 can determine the channel through which to notify selected users or recipients of an access request, a download, a file edit/modification, a file save or upload (e.g., an upload request, completion of upload of a single item, multiple items, and/or a full upload request). The channels that are used can include, indicators via a user interface to the online collaboration environment, SMS, audio message, text-based messages, email, desktop application, RSS, etc.

Figure 6:
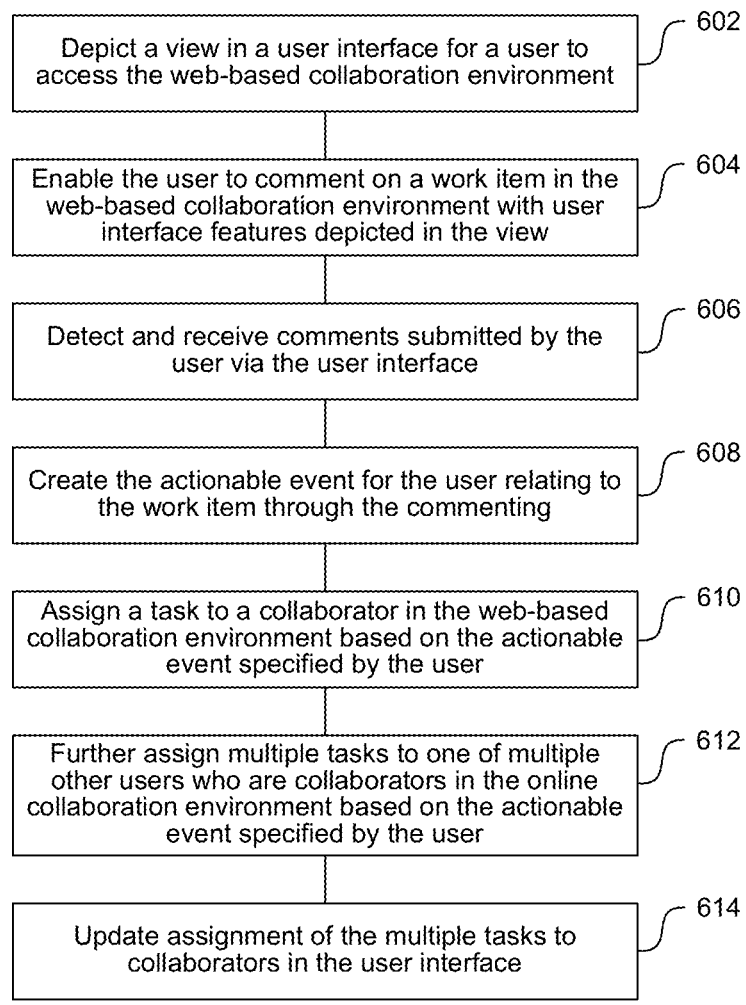
FIG. 6 depicts a flow chart illustrating an example process enabling a user to delegate tasks to other collaborators by creating actionable events through commenting in a user interface used to access a web-based collaboration environment.

FIG. 6 depicts a flow chart illustrating an example process enabling a user to delegate tasks to other collaborators by creating actionable events through commenting in a user interface used to access a web-based collaboration environment.

In process 602, a view is depicted in a user interface for a user to access the web-based collaboration environment.

In process 604, the system enables the user to comment on a work item in the web-based collaboration environment with user interface features depicted in the view.

In process 606, comments submitted by the user are detected and received via the user interface.

In process 608, the actionable event for the user relating to the work item is created through the commenting. For example, the user interface can include features (graphical and/or text based features) which allow the user to create the actionable event. The actionable event can be created to be acted on by another user who is a collaborator or other authorized user in the web-based collaboration environment.

The collaborator can be another user also associated with a work space with which the work item is associated or another user (e.g., a user whose membership with the work space is impending or an otherwise authorized user who may or may not be associated with the work space).

In process 610, a task is assigned to a collaborator in the web-based collaboration environment based on the actionable event specified by the user. The actionable event can include, an assigned task designated by the user to another user in the web-based collaboration environment where the assigned task can relate to the work item which the user comments on in the user interface. The assigned task can include a task for another user to review the work item or a task for another user to update or approve the work item. In one embodiment, a status of the assigned task is indicated and reflected in the user interface when updated. In addition, the status of the assigned task can be updated by the collaborator through the user interface.

In process 612, multiple tasks are assigned to one of multiple other users who are collaborators in the online collaboration environment based on the actionable event specified by the user. In addition, the user can update the assignment of each of the multiple tasks to collaborators in the user interface. In process 614, assignments of the multiple tasks to collaborators are updated in the user interface.

Figure 7:
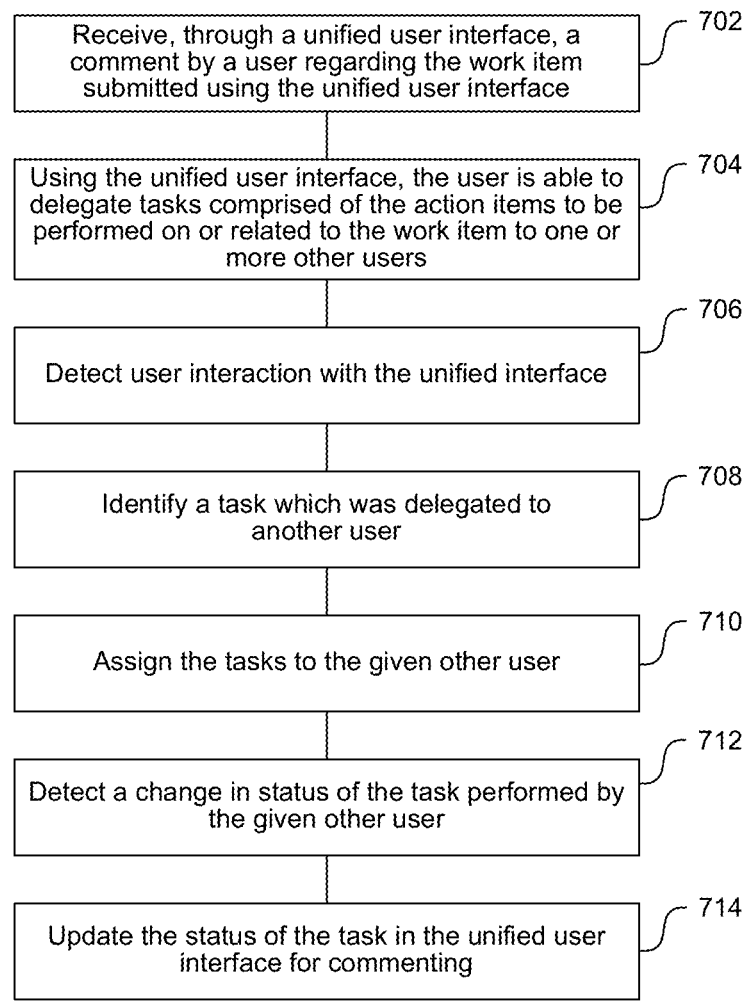
FIG. 7 depicts a flow chart illustrating an example process for managing task delegation and tasks status via a unified user interface used for commenting on work items in an online collaboration environment.

FIG. 7 depicts a flow chart illustrating an example process for managing task delegation and tasks status via a unified user interface used for commenting on work items in an online collaboration environment.

In process 702, a comment by a user regarding the work item submitted using the unified user interface, is also received through the unified user interface.

In process 704, using the unified user interface, the user is able to delegate tasks comprised of the action items to be performed on or related to the work item to one or more other users. The other users may be collaborators in a work space with which the work item is associated.

In process 706, user interaction with the unified interface is detected. Based on detection of the user interaction with the unified interface, in process 708, a task which was delegated to another user can be identified.

In process 710, the tasks are assigned to the given other user. The tasks can be assigned to the other user by providing access to the work item through a user interface accessible by the user in the online collaboration environment.

In process 712, a change in status of the task performed by the given other user is detected. In process 714, the status of the task is updated in the unified user interface for commenting. The status updates can include, for example, a completed status, an incomplete status or an in progress status.

Figure 8:
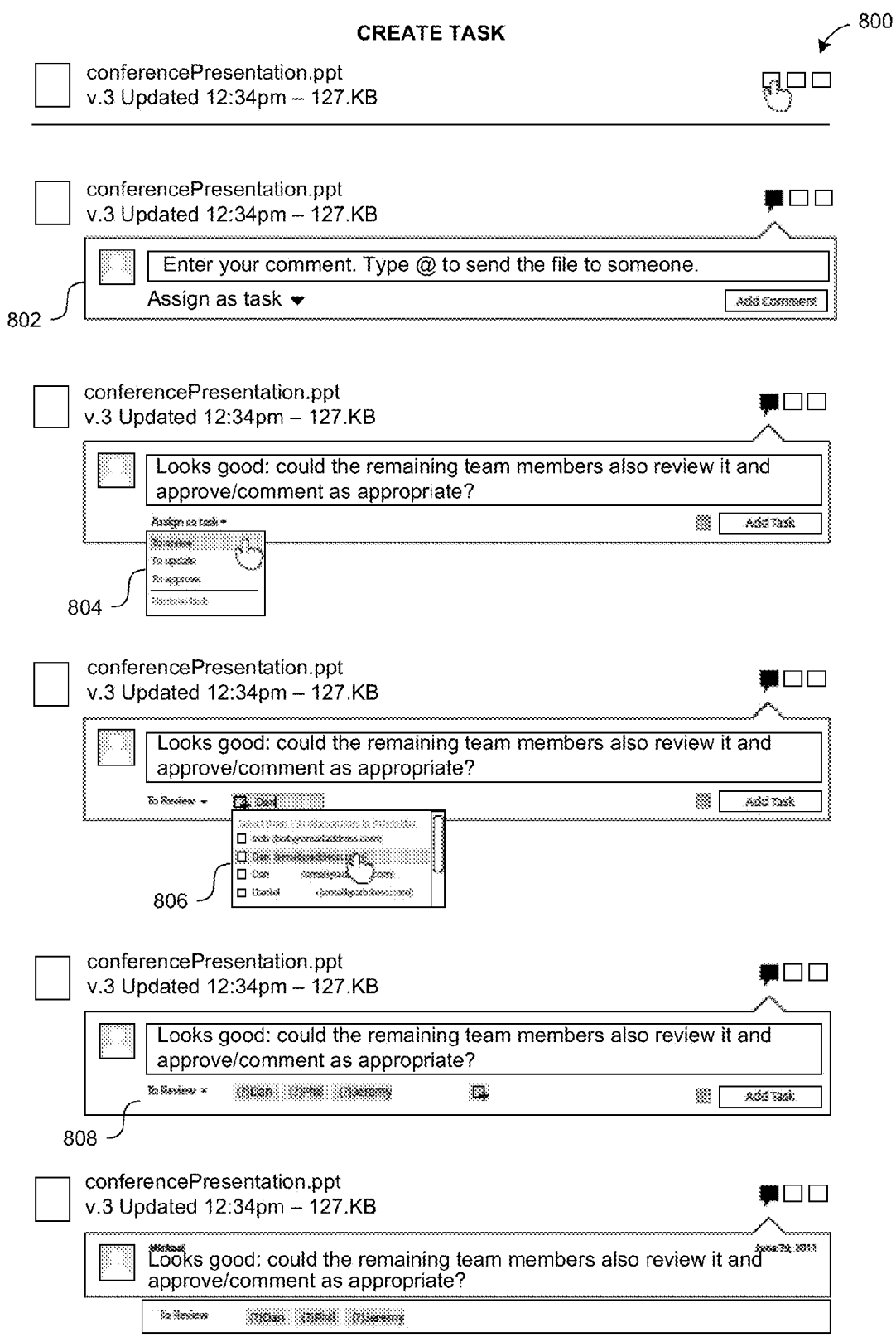
FIG. 8 depicts a screenshot showing an example of a user interface which can be used for task creation and assignment via a user interface also used for commenting on work items.

FIG. 8 depicts a screenshot showing an example of a user interface 800 which can be used for task creation and assignment via a user interface also used for commenting on work items. For example, through field 802, the user can enter a comment and also use the same user interface to assign the task to other users (e.g., via drop down tab 804). For example, the drop down menu 804 allows the user to specify the assigned task. In addition, the user can also enter a comment in field 802 which specifies other users or collaborators to which to send the file which is the subject of the selected task.

Via drop down menu 806, the user can also select the user/collaborator to whom to assign one or more tasks. The drop down menu 806 can by default, be populated with users affiliated with the work space with which the file "conferencePresentation.ppt" is associated or collaborators specified for the file or other select users (e.g., project managers, team leads, etc.). Once the users have been selected, filed 808 can depict the users who were assigned tasks for the given file, and also an identification of the task assigned to the user.

Figure 9:
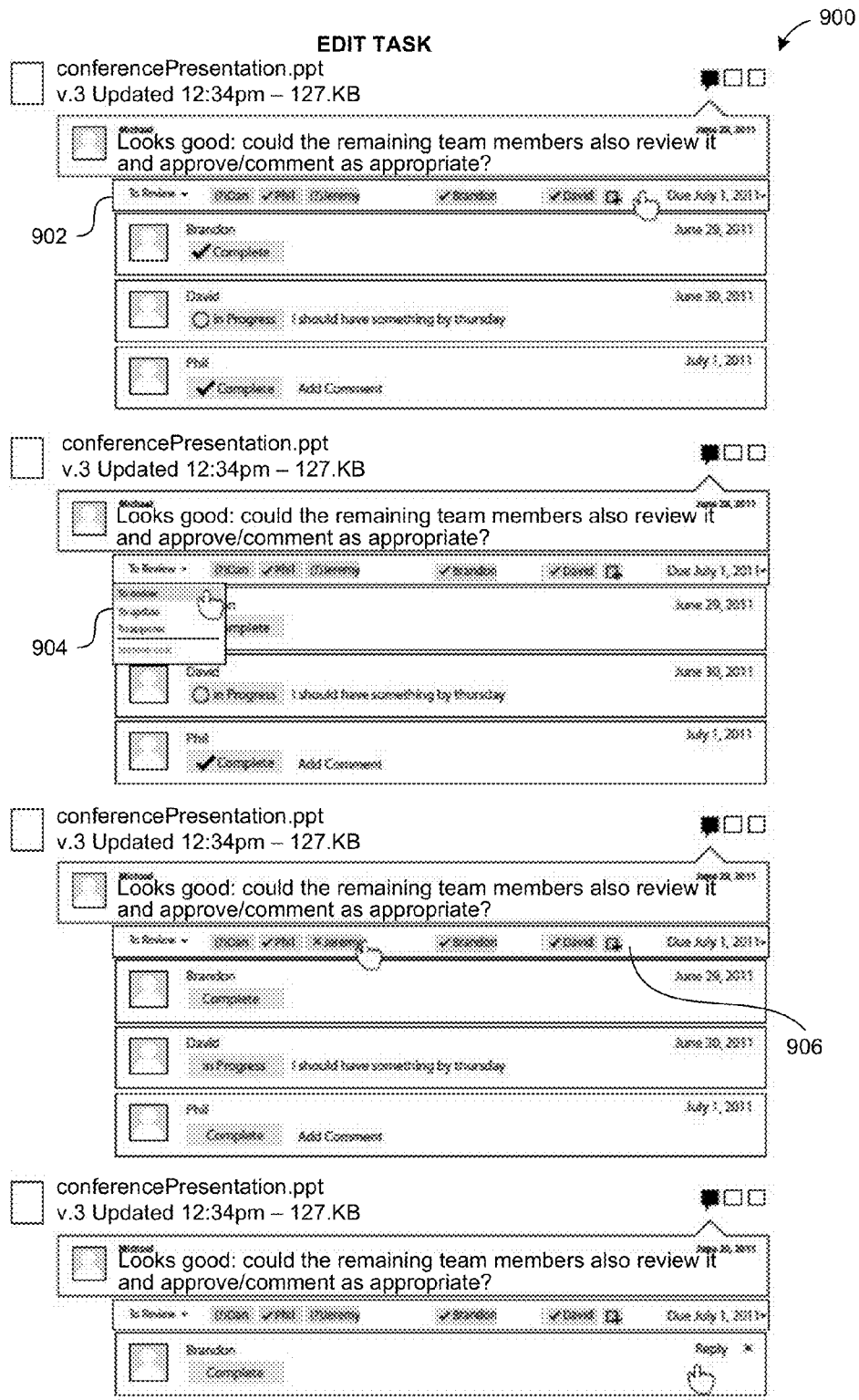
FIG. 9 depicts a screenshot showing an example of a user interface which can be used for editing assigned tasks and updating task assignments.

FIG. 9 depicts a screenshot showing an example of a user interface 900 which can be used for editing assigned tasks and updating task assignments.

For example, data field 902 and 904 can be used to view, update or edit tasks assigned to one or more users or collaborators. In addition, the status of various assigned tasks can be depicted in the same user interface allowing the delegates to also comment on their assigned tasks. Field 906 depicts a list of users or collaborators which have been assigned various tasks related to the file 'conferencePresentation.ppt' and can also depict an indication of the status (e.g., via (v) (x) or (?) of the status of the assigned tasks.

Figure 10:
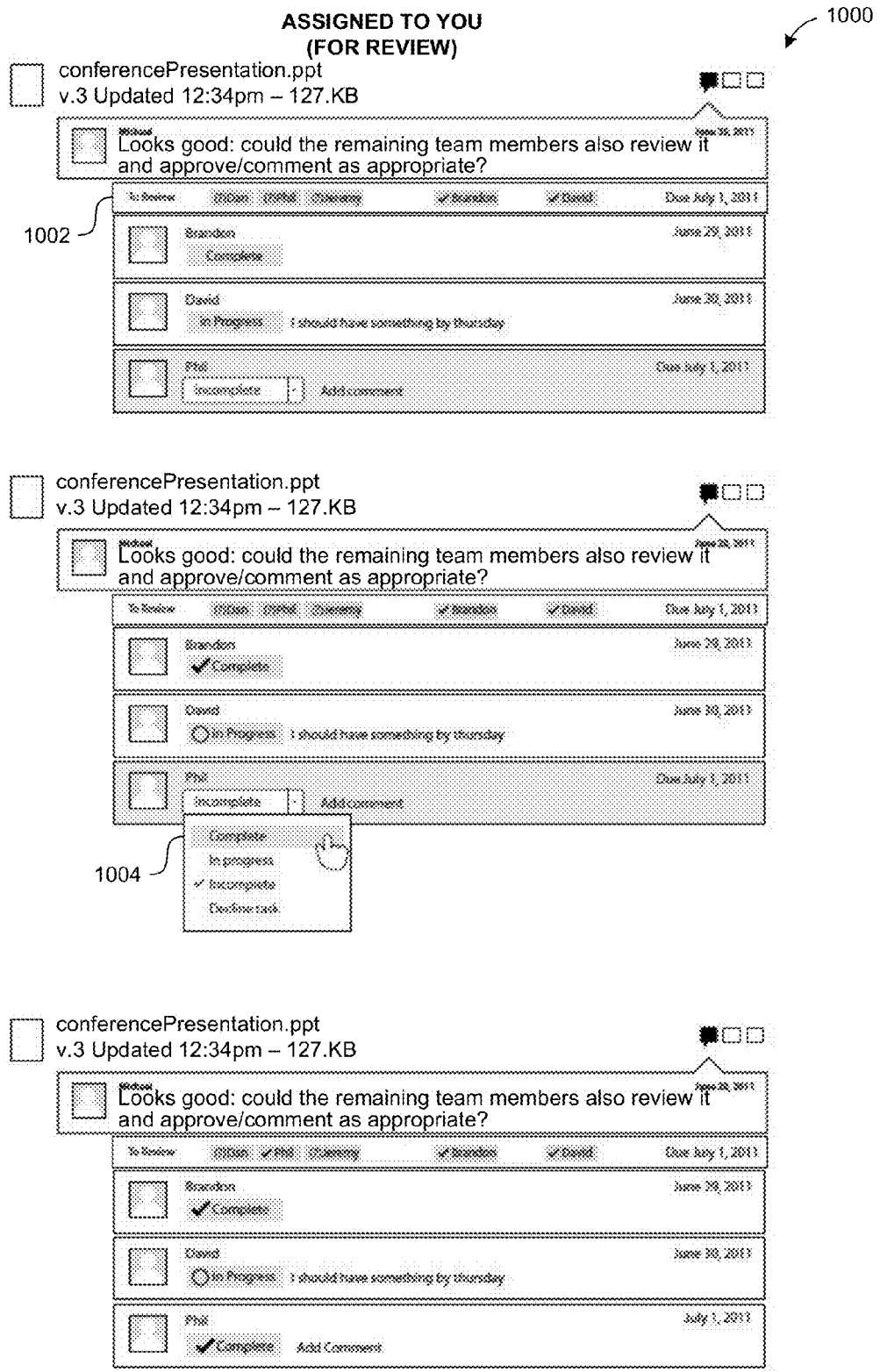
FIG. 10 depicts a screenshot showing an example of a user interface which can be used for reviewing assigned tasks and updating task statuses.

FIG. 10 depicts a screenshot showing an example of a user interface 1000 which can be used for reviewing assigned tasks 1002 and updating task statuses 1004. For example, a delegate (or a user who has been assigned a task) can use drop down menu 1004 to update the status of a task which he/she has been assigned through the user interface. The user interface can thus depict the aggregate status of tasks assigned to multiple collaborators.

Figure 11:
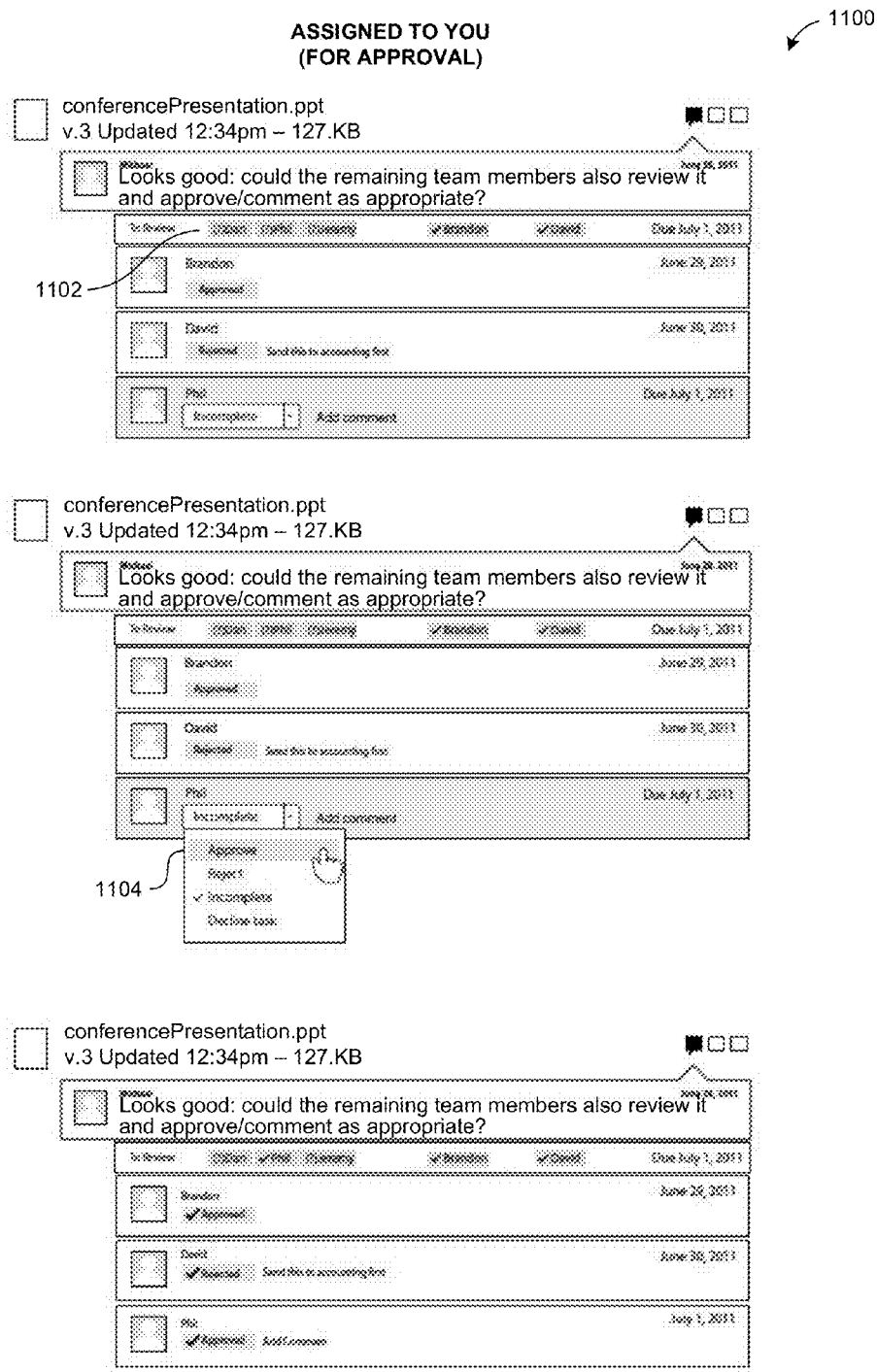
FIG. 11 depicts another screenshot showing an example of a user interface which can be used for reviewing assigned tasks for review to approve or reject.

FIG. 11 depicts another screenshot showing an example of a user interface 11000 which can be used for reviewing assigned tasks 1102 for review and to approve or reject. For example, drop-down menu 1104 allows a delegate to either approve or reject the document, or otherwise update the status to indicate it as being incomplete or to decline the task. The fields also allow the delegates to submit comments associated with the approvals or rejections.

Figure 12:
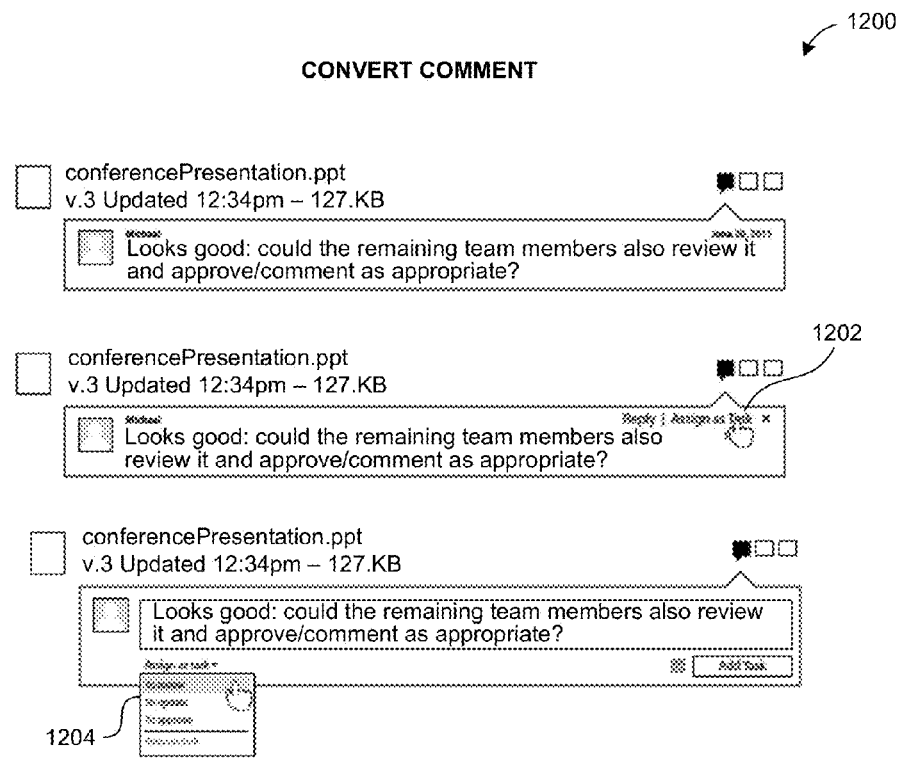
FIG. 12 depicts a screenshot showing an example of a user interface which can be used for converting comments related to a work item to an assigned task.
Figure 13:
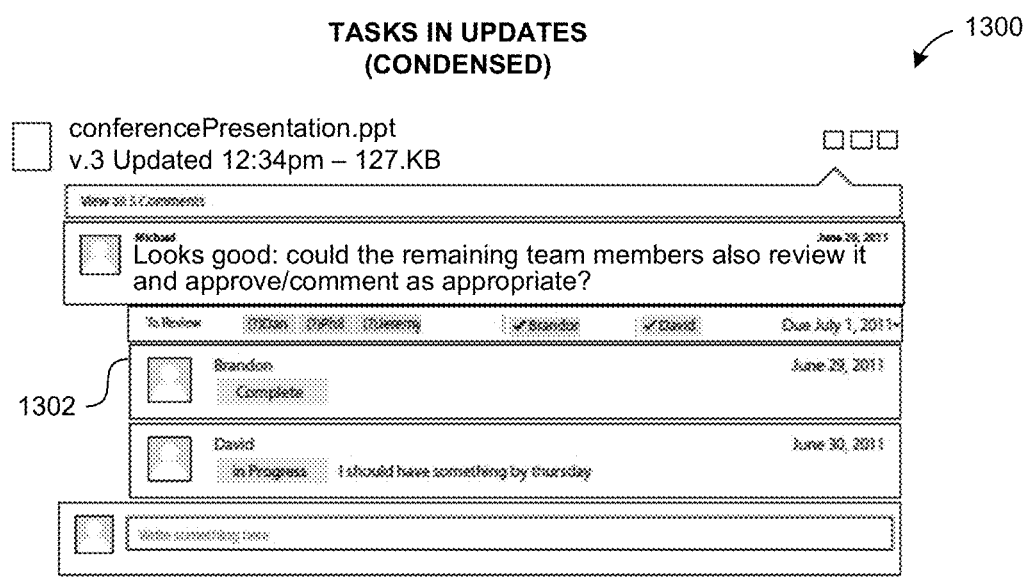
FIG. 13-14 depicts screenshots showing examples of user interfaces showing assigned tasks integrated in status updates including comments pertaining to work items.
Figure 14:
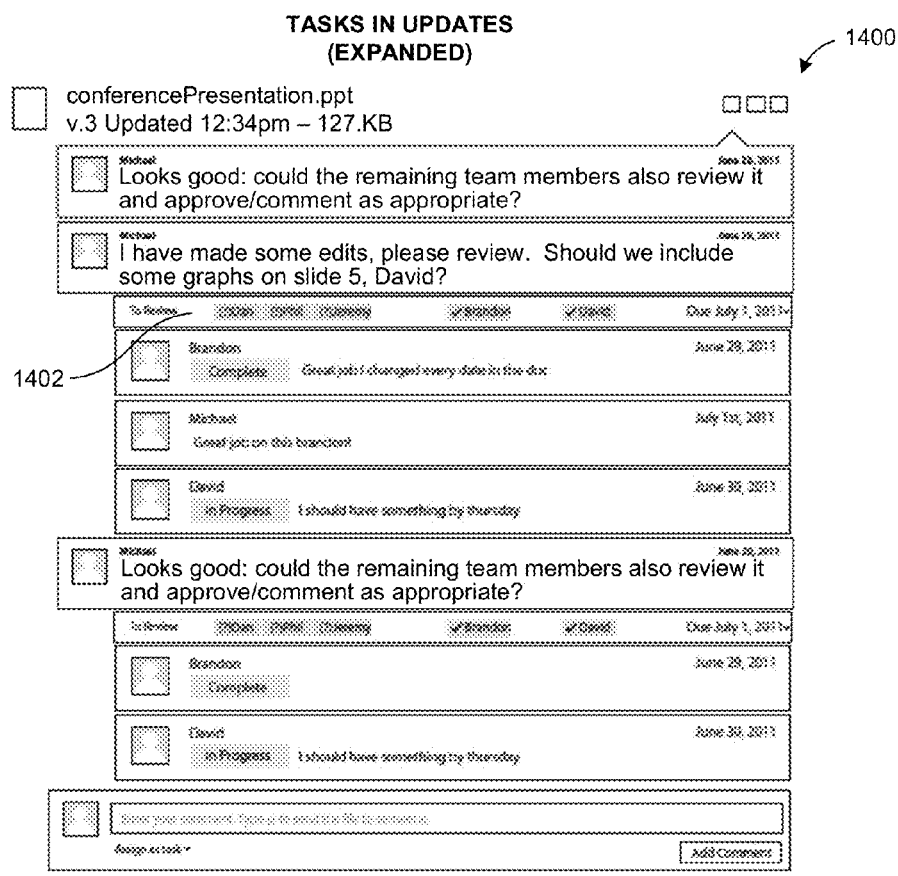

FIG. 12 depicts a screenshot showing an example of a user interface 1200 which can be used for converting comments 1202 related to a work item to an assigned task. FIG. 13-14 depicts screenshots showing examples of user interfaces showing assigned tasks integrated in status updates including comments pertaining to work items. For example user interface 1300 depicts a condensed view of assigned tasks integrated with comments and user interface 1400 depicts an expanded view of assigned tasks integrated with comments for a given document/file "conferencePresentation.ppt.'

Figure 15:
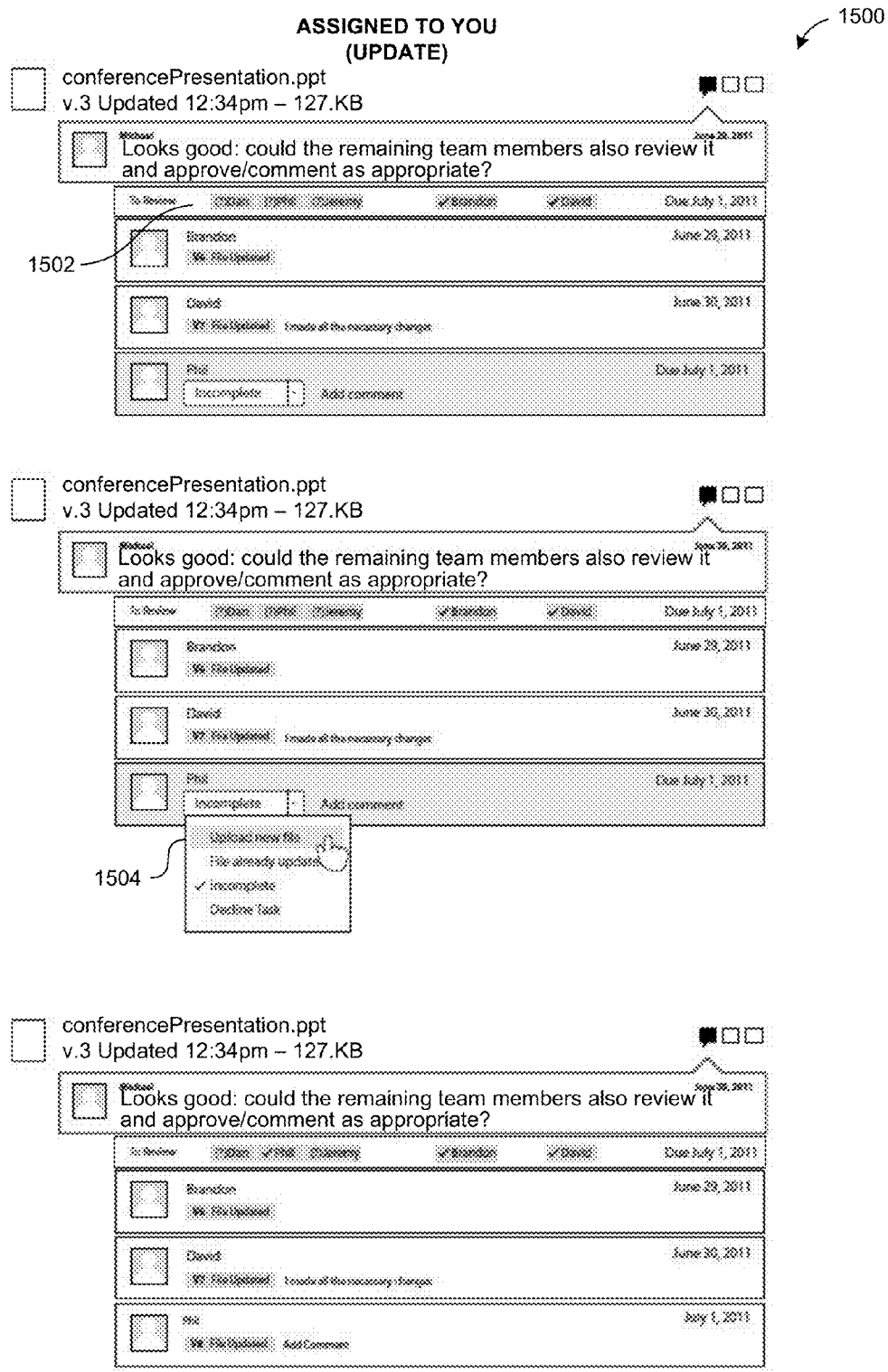
FIG. 15 depicts another screenshot showing an example of a user interface which can be used for reviewing assigned tasks and updating/tracking the status of tasks assigned to various collaborators.

FIG. 15 depicts another screenshot showing an example of a user interface 1500 which can be used for reviewing assigned tasks (e.g., via 1502) and updating/tracking the status of tasks assigned to various collaborators. For example, a delegate (e.g., user 'Phil') can utilize drop down menu 1504 to indicate the status of an assigned task and to perform any other actions pertaining to the completion of the task (e.g., by uploading a new version of the file or a new file, for example).

Figure 16:
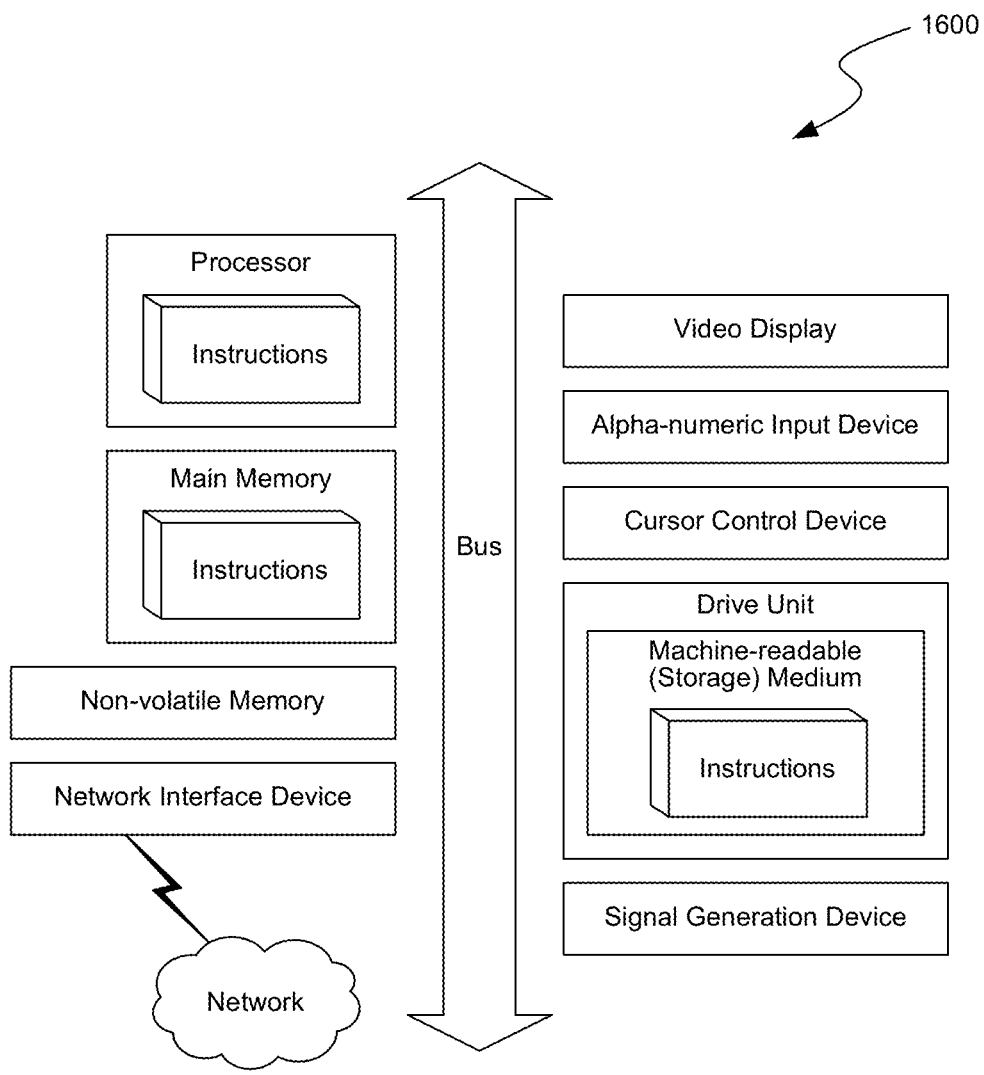
FIG. 16 shows a diagrammatic representation of a machine in the example form of a computer system within which a set of instructions, for causing the machine to perform any one or more of the methodologies discussed herein, may be executed.

FIG. 16 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method comprising:
   displaying, in a unified user interface for a cloud-based collaboration environment, a view in a discussion forum with integrated commenting and task assignment features;
   receiving, via the unified user interface, a first input including a comment regarding a work item stored in a particular workspace of a plurality of workspaces of the cloud-based collaboration environment;
   displaying, via the unified user interface, the comment based on the received first input, the displayed comment including a first option to convert the comment into an actionable event wherein the first option includes a displayed list of one or more assignable tasks;
   receiving a second input, via the unified user interface, including a selection of a first assigned task from the one or more assignable tasks;
   converting the comment, based on the first and second inputs, into a first actionable event associated with the work item, the first actionable event including the selected first assigned task to be performed on the work item;
   displaying, via the unified user interface, a second option to delegate the first assigned task to a collaborator of the cloud-based collaboration environment, wherein the second option includes a displayed list of one or more collaborators that have access to the particular workspace in which the work item is stored;
   receiving a third input, via the unified user interface, including a selection of a first collaborator, from the one or more collaborators with access to the particular workspace, to which to delegate the first assigned task;
   assigning, based on the third input, the first assigned task to be performed on the work item by the selected first collaborator, wherein a status of the first collaborator's performance of the first assigned task is tracked and updated by a server computer operating as part of the cloud-based collaboration environment;
   detecting a second actionable event associated with the work item, the second actionable event including a second assigned task delegated to be performed on the work item by a second collaborator;
   in response to determining that the first assigned task must be performed on the work item before the second assigned task, automatically:
      providing access to the work item, via the unified user interface, to the first collaborator before providing access to the second collaborator;
      tracking the status of the first collaborator's performance of the first assigned task on the work item; and
      displaying an indication of the tracked status of the first collaborator's performance of the first assigned task on the work item in the same unified user interface through which the comment regarding the work item was received; and
   in response to detecting, based on tracking the status of the first assigned task, that the first assigned task has been completed by the first collaborator, automatically providing access to the work item, via the unified user interface, to the second collaborator.

2. The method of claim 1, wherein the first assigned task is selected from the group consisting of: review, approve, update, edit, and complete.

3. The method of claim 1, wherein the first actionable event is associated with completion time.

4. The method of claim 1, wherein the first actionable event includes a task to review the work item.

5. The method of claim 1, wherein the first actionable event includes a task to update or approve the work item.

6. The method of claim 1, wherein the status of the first collaborator's performance of the first assigned task on the work item is based on an update on the status received from the first collaborator via the unified user interface.

7. The method of claim 6, wherein a status of the first actionable event is based on the status of the first assigned task associated with the first actionable event.

8. The method of claim 1, wherein user names are created as linkable items in the comment received through the unified user interface.

9. The method of claim 1, further comprising:
   detecting a change in status of the first actionable event, based on a received input indicating an interaction with the work item by the first collaborator via the unified user interface.

10. The method of claim 9, wherein the status includes a completed status, an incomplete status, or an in progress status.

11. The method of claim 1, wherein the first assigned task includes an associated due date.

12. A non-transitory computer-readable medium including instructions stored thereon, which when executed by a processor of a computer system, cause the computer system to:
   display, in a unified user interface for a cloud-based collaboration environment, a view in a discussion forum with integrated commenting and task assignment feature;
   receive, via the unified user interface, a first input including a comment regarding a work item stored in a particular workspace of a plurality of workspaces of the cloud-based collaboration environment;

display, via the unified user interface, the comment based on the received first input, the displayed comment including a first option to convert the comment into an actionable event, wherein the first option includes a displayed list of one or more assignable tasks;

receive a second input, via the unified user interface, including a selection of a first assigned task from the one or more assignable tasks;

convert the comment, based on the first and second inputs, into a first actionable event associated with the work item, the first actionable event including the selected first assigned task to be performed on the work item;

display, via the unified user interface, a second option to delegate the first assigned task to a collaborator of the cloud-based collaboration environment, wherein the second option includes a displayed list of one or more collaborators that have access to the particular workspace in which the work item is stored;

receive a third input, via the unified user interface, including a selection of a first collaborator, from the one or more collaborators with access to the particular workspace, to which to delegate the first assigned task;

assign, based on the third input, the first assigned task to be performed on the work item by the selected first collaborator, wherein a status of the first collaborator's performance of the first assigned task is tracked and updated by a server computer operating as part of the cloud-based collaboration environment;

detect a second actionable event associated with the work item, the second actionable event including a second assigned task delegated to be performed on the work item by a second collaborator;

in response to determining that the first assigned task must be performed on the work item before the second assigned task, automatically:

provide access to the work item, via the unified user interface, to the first collaborator before providing access to the second collaborator;

track the status of the first collaborator's performance of the first assigned task on the work item; and display an indication of the tracked status of the first collaborator's performance of the first assigned task on the work item in the same unified user interface through which the comment regarding the work item was received; and in response to detecting, based on tracking the status of the first assigned task, that the first assigned task has been completed by the first collaborator, automatically provide access to the work item, via the unified user interface, to the second collaborator.

13. The non-transitory computer-readable medium of claim 12, further comprising instructions stored thereon, which when executed by the processor, cause the computer system to further, create a linkable item associated with mention of a user name in the comment entered in the unified user interface.

14. The non-transitory computer-readable medium of claim 12, wherein, the first actionable event includes a task to review the work item.

15. The non-transitory computer-readable medium of claim 12, wherein, the first actionable event includes a task to update or approve the work item.

16. The non-transitory computer-readable medium of claim 12, wherein, the status of the first collaborator's performance of the first assigned task on the work item is based on an update on the status received from the first collaborator via the unified user interface.

17. A system comprising:

one or more processors; and one or more memory units coupled to the one or more processors, the one or more memory units having instructions stored thereon, which when executed by the one or more processors, cause the system to:

display, in a unified user interface for a cloud-based collaboration environment, a view in a discussion forum with integrated commenting and task assignment features;

receive, via the unified user interface, a first input including a comment regarding a work item stored in a particular workspace of a plurality of workspaces of the cloud-based collaboration environment;

display, via the unified user interface, the comment based on the received first input, the displayed comment including a first option to convert the comment into an actionable event, wherein, the first option includes a displayed list of one or more assignable tasks;

receive a second input, via the unified user interface, including a selection of a first assigned task from the one or more assignable tasks;

convert the comment, based on the first and second inputs, into a first actionable event associated with the work item, the first actionable event including the selected first assigned task to be performed on the work item;

display, via the unified user interface, a second option to delegate the first assigned task to a collaborator of the cloud-based collaboration environment, wherein the second option includes a displayed list of one or more collaborators that have access to the particular workspace in which the work item is stored;

receive a third input, via the unified user interface, including a selection of a first collaborator, from the one or more collaborators with access to the particular workspace, to which to delegate the first assigned task;

assign, based on the third input, the first assigned task to be performed on the work item by the selected first collaborator, wherein a status of the first collaborator's performance of the first assigned task is tracked and updated by server computer operating as part of the cloud-based collaboration environment;

detect a second actionable event associated with the work item, the second actionable event including a second assigned task delegated to be performed on the work item by a second collaborator;

in response to determining that the first assigned task must be performed on the work item before the second assigned task, automatically:

provide access to the work item, via the unified user interface, to the first collaborator before providing access to the second collaborator;

track the status of the first collaborator's performance of the first assigned task on the work item; and display an indication of the tracked status of the first collaborator's performance of the first assigned task on the work item in the same unified user interface through which the comment regarding the work item was received; and in response to detecting, based on tracking the status of the first assigned task, that first assigned task has been completed by the first collaborator, automatically provide access to the work item, via the unified user interface, to the second collaborator.

18. The system of claim 17, wherein the first assigned task is selected from the group consisting of: review, approve, update, edit, and complete.

19. The system of claim 17, wherein the one or more memory units have further instructions, which when executed by the one or more processors, cause the system to further:
   detect a change in status of the first actionable event, based on a received input indicating an interaction with the work item by the first collaborator via the unified user interface; and
   display the change in status of the first actionable event, including the first assigned task associated with the first actionable event, via the unified user interface.

* * * * *